Patented Aug. 25, 1936

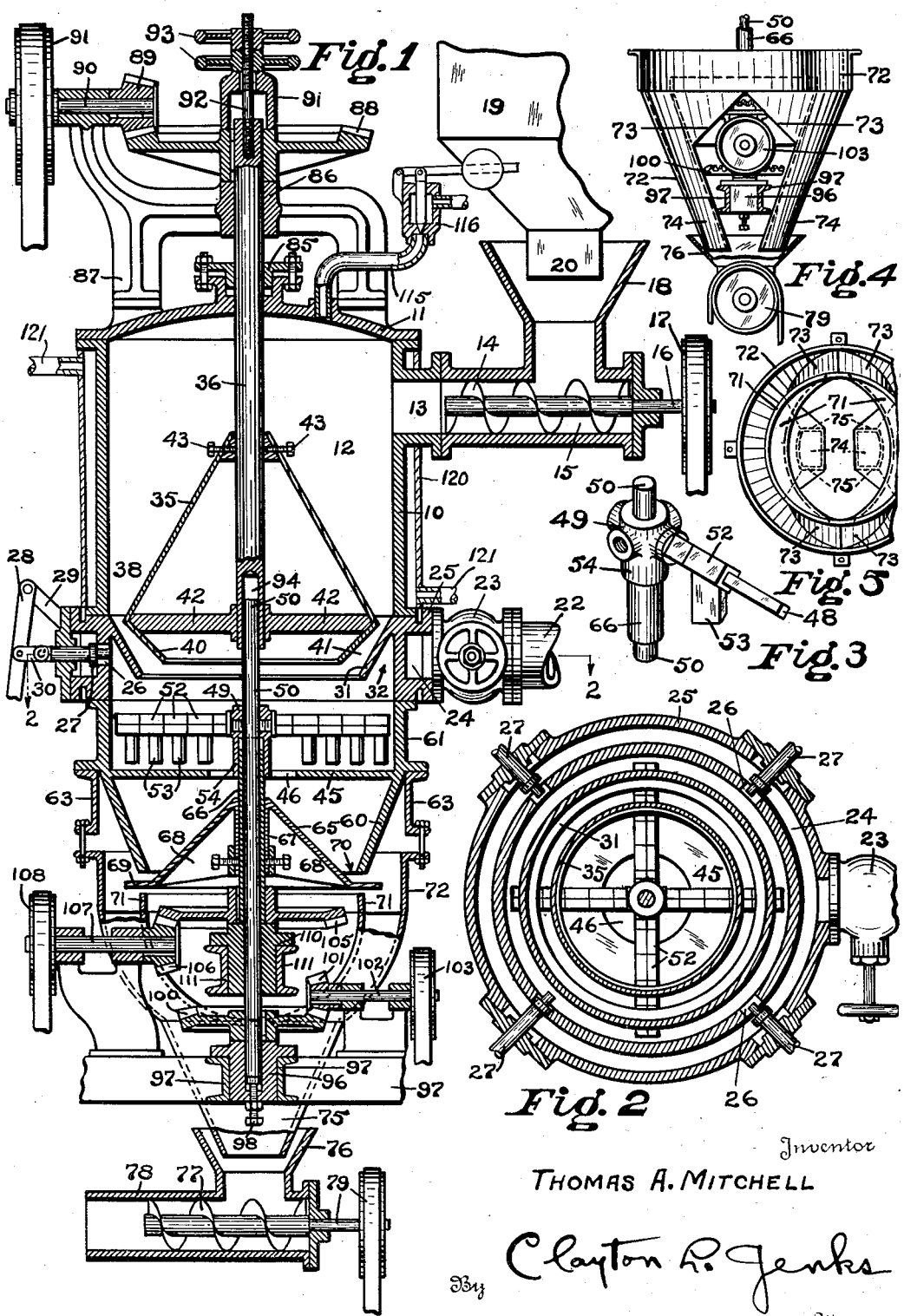

2,051,962

UNITED STATES PATENT OFFICE 2,051,962

APPARATUS FOR TREATING GRANULAR MATERIAL WITH A REAGENT GAS

Thomas A. Mitchell, Denver, Colo., assignor to Hughes-Mitchell Processes, Incorporated, Denver, Colo., a corporation of Wyoming Application March 12, 1934, Serial No. 715,083

14 Claims. (Cl. 266—1)

This invention relates to an apparatus for treating granular materials with reagent gases, and particularly for treating iron oxide, or an ore material containing the same, with hydrochloric acid gas for the purpose of forming iron chloride therein, as well as the chlorides of other chloridizable ore metal compounds which may be present.

In accordance with the invention disclosed in my Patent No. 1,979,280 dated November 6, 1934, I have heretofore proposed to chloridize an ore material, such as a roasted zinc sulfide ore, or other suitable ore material, by passing the ore serially through first and second absorbers and then a finisher. The first absorber serves to convert ore metal oxides, such as zinc oxide, to the chloride form, and the second absorber converts ferric oxide within the ore material to the chloride. This ferric chloride in turn acts as a reagent for chloridizing other ore metal compounds, and such ferric and ferrous chlorides as remain are thereafter decomposed in the finisher by means of heat and oxygen to form ferric oxide and nascent chlorine for further treatment of the ore material. In this process the second absorber is so constructed and operated as to provide a deep ore bed containing the ferric oxide, into which a stream of hydrochloric acid gas is passed; and precautions are taken to insure that no material amount of air is present, so that ferric chloride may be formed at a temperature above that point at which it will normally decompose in the presence of oxygen. This formation of ferric chloride is materially accelerated if the heat of reaction is accumulated or absorbed in a deep bed of ore, and it may be permitted efficiently to raise the temperature of the ore material to 180° C. or higher. Under the conditions of this process, the water of reaction is wholly driven off as steam, some of which may be taken up as water of crystallization in the ferric chloride at the lower end of the apparatus if sufficiently cool for the purpose; hence the ore material remains substantially dry and granular in character.

The present invention relates to an improvement in the chloridizing apparatus of my prior construction, and its primary object is the provision of an apparatus for chloridizing iron or other oxides, either alone or in the presence of ore or other material, which may be operated continuously and efficiently at a required temperature and under controlled conditions, and which is so constructed and arranged that the ore material and the reagent gas may be fed at controlled rates and the ore will pass continuously and without interruption through the apparatus.

A further object is to provide an apparatus of the type described which is adapted for various uses and which is particularly efficient in its use for treating granular materials by means of reagent gases. Various other objects will be apparent in the following disclosure.

Referring to the drawing; Fig. 1 is a vertical section, but with some parts broken away or shown diagrammatically for the sake of clarity of illustration, of my preferred form of chloridizing apparatus;

Fig. 2 is a horizontal section on the line 2—2 of Fig. 1;

Fig. 3 is an isometric detail of the ore stirring device, partly broken away;

Fig. 4 is a vertical elevation of the lower feeding hopper; and

Fig. 5 is a top plan view, partly broken away, of the hopper shown in Fig. 4.

As will be readily apparent from the disclosure of my prior application, this apparatus is intended primarily for the treatment of ore material, such as ferric or ferrous oxide or ore mixtures containing the same, which is fed at a desired rate while it is being subjected to the action of a strong hydrochloric acid gas. It will, however, be appreciated that this apparatus may be used in other processes, and that various materials may be treated as desired with chloridizing or sulfating or other types of gases as are required to produce the desired compounds; and the invention is not to be considered as limited to a chloridizing process although specifically described herein as applied to such an operation. A process of this type requires continuity of operation and insurance against stoppage of the ore flow at any point in the process, as well as the ability to regulate the rate of flow of the ore material and the reagent gas and the time during which they may be permitted to remain in contact. This invention contemplates the provision of an apparatus which adequately performs these various objects.

Referring to the drawing illustrating one embodiment of the invention, I have there shown a multi-part apparatus made of suitable material, such as iron, which is substantially cylindrical in shape and may be made up of various units adapted to be separately manufactured and then assembled in proper relation, as will be readily understood. The apparatus comprises a casing 10 having a cover 11 closing the top and forming with associated parts a chamber 12 within which the ore material is initially treated. A suitable ore feeding device serves to introduce the ore material or other granular substance to be treated into the compartment 12. The feeding device illustrated comprises a pipe 13 opening into the upper end of the compartment 12, through which the ore material is fed by means of a screw 14 mounted within a conveyor chamber 15 and rotated by means of a suitable shaft 16 and a pulley and belt device 17. A hopper 18 communicates with the screw chamber and is in turn fed from an ore supply bin 19 thereabove which has a depending pipe 20 fitting within the hopper. The arrangement of the pipe 20 and hopper 18 as well as the construction of the screw conveyor serves to form an effective gas seal, which prevents gas from escaping outwardly from the compartment 12, and it equally prevents the admission of any material amount of air into the chloridizing chamber. Such air as is entrapped in the ore material is insufficient to detrimentally affect the reactions in this apparatus.

Hydrochloric acid gas or other suitable reagent gas is fed into the chamber 12 through a pipe 22 having a control valve 23 therein. This gas is introduced into an annular chamber 24 formed within a casting 25, which serves as a part of the casing 10. This annular chamber has a series of ports 26 which introduce the gas from the annular chamber 24 to the inside compartment of the casing. These ports may be regulated in their gas admitting ability by suitable valves. Each valve, as illustrated in the drawing, may comprise a plunger 27 which slidably moves into or out of the gas port 26 for the purpose of providing an effective gas seal or control valve. The plunger 27 may be moved to a desired adjusted position by any suitable device, such as the handle 28 pivotally connected thereto and in turn pivotally connected by means of an arm 29 to the outside of the casing, a short link 30 serving as a connection between the handle and the plunger. By providing a series of these valved gas ports around the annular chamber 24, it is possible to regulate the gas admission and insure a proper distribution thereof within the chamber 12. The casting 25 is provided with an inwardly depending flange 31 shaped as an inverted frustrum of a cone and arranged to cause the descending body of ore material to form a space 32 behind the flange 31, into which the hydrochloric acid gas may be admitted and from which it may readily pass into the descending ore stream and upwardly into the main compartment of the chamber 12.

One of the primary features of this invention involves the provision of apparatus which will insure the feeding of the ore material through the apparatus at a proper rate at all times and at independently controlled rates within the different portions of the apparatus. For this purpose, I provide ore stirring and moving devices within the casing 10. These comprise a cone deflector 35 mounted on the rotating shaft 36, as illustrated, and which is of such size and shape that it forms a gradually converging space 38 within the ore chamber 12. The lower end of this cone 35 is spaced at a suitable distance from the casing wall or flange 31 and the two parts form a narrow, annular throat therebetween which serves both to support the ore body and to permit a regulated escape of the ore material as it is being treated by the hydrochloric acid gas. In the preferred construction, the cone 35 has fastened to its lower edge a further inwardly turned depending flange 40, which diverges from the flange 31 and thus makes a passage 41 of increasing width between the flanges 31 and 40, whereby the ore material may readily escape therefrom and not be frictionally held by the sides of these two flanges. The cone 35 and the flange portion 40 may be suitably secured by radially extending arms 42 to the shaft 36, and screws or other suitable means may be employed for holding the cone 35 in proper relationship to the depending flange 31.

The ore which escapes through the throat is caught on a flat plate or shelf 45. This shelf has a central opening 46, through which ore material may escape into a feeding device below. The ore passing downwardly through the throat 41 falls onto this shelf 45 at a regulated rate, and in order that it may be fed from the chamber 12 at a required rate, stirring and feeding rake arms 48 (Fig. 3) are provided. These may comprise radial arms screw threaded into a sleeve 49 on the shaft 50 and arranged to be revolved in a horizontal plane. This sleeve is suitably secured to the shaft 50, as may be required. Rakes 52, which may comprise separate castings, may be slidably mounted on the rake arms 48. These rakes have depending blades 53 arranged at such an angle that they will, when revolved, move the ore material inwardly over the shelf 45 and through the opening 46, as will be readily understood. A depending flange 54 on the sleeve 49 prevents ore material from getting into the bearings or interfering with the operation of the shaft and its various parts.

An inwardly depending frustro-conical flange 60 projects below the shelf 45 and serves as a retaining wall for the ore material as it descends. For convenience in manufacture, the shelf 45 and the flange 60 are cast integrally with a cylindrical wall 61 which is assembled beneath and forms a continuation of the casting 25. These various parts are suitably fastened together, as by means of flanges and bolts, or other devices, as may be required. The casting 61 and the parts thereabove are shown as mounted on two channel beams 63, which are suitably supported, as may be desired.

A feeding device, which cooperates with the flange 60 to support and to remove the material that passes downwardly through the opening 46, and at the same time provides a gas seal, comprises a cone 65 mounted on a sleeve 66, which surrounds the shaft 50 and is rotated independently thereof. The cone has a downwardly depending sleeve 67 which surrounds the sleeve 66 and radial webs 68 connecting the sleeve 67 and the cone 65; and the cone is suitably secured to the sleeve 66 by set screws or other suitable devices, which permit a vertical adjustment of the cone 65 and, therefore, an adjustment of the spacing of the cone from the depending flange 60. The lower end of the cone 65 terminates in a flat horizontal shelf or plate 69. Ore material passing downwardly through the annular hopper formed between the cone 65 and the plate 69 is, therefore, fed through the throat 70 between these parts and then thrown laterally off the horizontal plate 69 by centrifugal force. The amount of material fed downwardly through the throat 70 between parts 60 and 65 will be regulated by the vertical adjustment of the cone.

Suspended from the channel beam 63 is a bifurcated annular hopper adapted to receive the material thrown off from the plate 69 as the latter revolves. This hopper comprises two spaced concentric walls 71 and 72, each of which is substantially a fragment of a frustrum of a cone. The inner wall 71 terminates below the top of the outer wall 72 and provides therebetween an annular space, into which the plate 69 discharges. The two walls 71 and 72 are cut away on their diametrically opposite sides to provide space for the driving mechanism which rotates the shaft 50 and associated feeding devices. Within the annular hopper space are two sets of sloping plates 73 which form a roof over the driving mechanism. Their purpose is to direct the material falling thereon into the two spaced pipe channels 74 formed between the two depending walls 71 and 72. Radial side walls 75 connect the walls 71 and 72 and form therewith the pipes 74. The lower ends of the two spaced pipes 74 of the hopper open into a further hopper 76 located therebelow and this hopper serves to direct the material into a screw conveyor or other suitable device for removing the ore material. This device may comprise a screw 77 mounted in a suitable casing 78 and driven by shaft, pulley and belt 79, as is apparent in the drawing.

In order that these various rotatable feeding devices may be independently controlled, they are mounted to be rotated by separate driving shafts, as illustrated. The shaft 36 passes upwardly through an opening in the cover plate 11 and through a suitable gland 85 which has packing arranged therein to prevent the escape of gas upwardly around the shaft. This shaft is slidably mounted within the radial bearing 86 of suitable construction, which is mounted on the support 87 secured to the top cover 11 of the casing. The upper end of the shaft carries a bevelled gear 88, which is driven by a pinion 89 on a short shaft 90, which is in turn rotated by a belt and pulley device 91.

This cone 35 may be raised and lowered in order to change the width of the opening 41 by means of a device which serves to raise and lower the shaft 36. To accomplish this purpose, the bevelled gear 88 is slidably keyed to the shaft 36 so that the shaft may be raised and lowered through the bevelled gear. A yoke 91 seated on the bevelled gear 88 adjustably supports a rod 92 which is secured to the upper end of the shaft 36 as by a small pin. The upper end of the rod, which projects through an opening in the yoke 91, is provided with screw threads on which are threaded two hand wheels 93. These parts are so arranged that by rotating the two hand wheels and locking them against one another and against the yoke 91, the shaft 36 may be raised and lowered relative to the yoke.

The lower end of the shaft 36 is hollowed out to form a bearing sleeve 94, which slidably contains the upper end of the shaft 50, whereby the two shafts each form a bearing for the other and permit independent rotation thereof. The lower end of the shaft 50 is suitably mounted within a radial and thrust bearing 96, which is supported on the I-beams 97. The shaft 50 may be vertically adjusted by means of the set screw 98 passing through the bearing 96 and engaging a collar beneath the shaft. By turning the set screw, the shaft may be raised or lowered, as desired, so as to regulate the position of the rake arms 53 relative to the shelf 45.

The shaft 50 is suitably rotated, as by means of a bevel gear 100 driven by a meshing gear 101 and a shaft 102 and belt driven pulley 103. Similarly, the feeding cone 65 is revolved by means of bevelled gears 105 and 106, a jack shaft 107 and pulley 108. It is to be noted that the bevelled gear 105 is keyed to the sleeve 66 and that the sleeve is rotatably mounted on the shaft 50 for rotation independently thereof, the shaft 50 serving as a bearing for this sleeve. A lower thrust bearing is formed by the sleeve 110 surrounding the shaft 50 and which is suitably supported on I-beams 111.

In order to permit the escape of any excess moisture and gases, which may remain in the chamber 12, a suitable pipe 115 is mounted on the cover 11 and connected with the inner chamber. A valve or a pressure control device 116 or other suitable construction may be employed for controlling the outflow of gases from the chamber and making it possible to have the gas under considerable pressure within the chamber 12. However, if iron oxide is being chloridized, the major portion of the hydrochloric acid gas introduced through the pipe 20 is absorbed directly into the ore material. Also, suitable water cooling or heating devices may surround the jacket 10 for controlling the temperature therein. For example, an insulating jacket may be employed, if desired, for holding in the heat of reaction generated by the hydrochloric acid gas attacking the ferric oxide within the chamber. If desired, an annular wall 120 may be arranged outside of the wall 10 and forming a cooling jacket or heat exchange chamber, to and from which heated or cooled fluid may be supplied by the inlet and outlet pipes 121 and 122. The air space thus formed may serve also as an insulation, or the space may be filled with suitable material for the purpose.

The operation of the device will now be apparent. Ore is fed from the hopper 19 by means of a screw conveyor 14 through the port 13 and into the chamber 12. The ore material in the port 13 and the feeding device 15 serves as an effective gas seal. The ore is allowed to pile up within the chamber 12 on the cone 35 to a desired extent, and the cone is rotated at a suitable rate, so that the material is being continually stirred. The ore material is preferably fed in a pulverized or granular condition, which is sufficiently finely divided so that the gas may readily attack the given ore constituents. The rotating cone 35 agitates the material and keeps it from forming lumps. The hydrochloric acid gas passing upwardly through the throat 41 attacks the material and gradually converts the iron oxide to the chloride.

The rate of feed of the material through the throat 41 is regulated by the rate at which the cone 35 rotates, as well as the spacing of the cone from the flange 31. In this way, the ore material may be caused to pile up to a required depth in the chamber 12 and be fed downwardly at a desired rate. The material falls onto the floor plate 45 and is there agitated in the presence of the strong hydrochloric acid gas by means of the rake arms; and a final chloridizing operation takes place at this point, where the strong gas meets the pulverized material. The material escaping through the floor opening 46 piles up on the rotating hopper 65 and against the depending flange 60, and thus forms an effective gas seal. The material escapes from the plate 69 at the bottom of the cone 65 through the opening 70 at the required rate and then passes downwardly through the hopper passages 72 into the lower hopper 76, from which it is removed from the zone of operation by the screw conveyor.

By suitably regulating the spacings of the cones from the casing walls and by regulating the rates of rotation of the cones, the material may be allowed to pile up in the different parts of the apparatus to the required extent, thus forming effective gas seals and permitting the presence of a desired amount of material within the casing for mass action with the hydrochloric acid. The rate of feed of the ore through the apparatus determines the mass of ore which is to be treated by the gas at any given time. In the preferred operation of this device, a large amount of iron oxide ore is permitted to pile up in the reaction zone, so that there will be a considerable development of heat of reaction and a consequent higher temperature within the apparatus. By controlling the amount of ore fed to the apparatus and its depth in the reaction chamber 12, as well as the amount of hydrochloric acid gas introduced through the valved pipe 22, the mass reaction and the temperature of the material will be controlled. This determines the conditions of the reaction and the rate at which ferric chloride is formed. Air is prevented from admission to the apparatus, as well as the escape of the gases therein, so that the process takes place in the absence of any material amount of air and the ferric chloride will not be dissociated by the oxygen present to any material extent, even if the temperature goes materially above that point at which the iron chloride is not stable in the presence of air. As the chloridized material expands in volume and falls through the annular opening 41 onto the shelf 45 and is removed therefrom by the rake blades 53 moving it inwardly and through the opening 46, the volume of material in this space above the shelf 45 is also under control. The speed of the rake blades 53 is controlled by the belt 103 and, therefore, the volume of material on shelf 45 is regulated so that it can be prevented from piling up on shelf 45 to such an extent as to fill the space 32 and obstruct the flow of the reagent gases through the ports 26. Likewise, the volume of material in the convergent space formed by the walls 60 and the cone 65 is controlled by the width of the opening 79 and the speed of the cone 65 and this is so regulated as to form at all times an air seal at the point of exit of the ore 70. Hence, the depth of ore bed and its rate of movement are controlled in every part of the apparatus.

Having thus described my invention, what I claim as new and desire to secure by Letters Patent is:

1. An apparatus for treating ore material comprising a casing having an ore inlet, a substantially horizontal bottom within said casing which has a discharge passage therethrough, means including a set of rake arms to move ore material across said bottom and through said discharge passage, means above said rake arms including a rotatable cone which supports ore material thereabove and feeds it at a graduated rate to the rake arms, and means for supplying reagent gas to the space between the cone and rake arms.

2. An apparatus of the type covered by claim 1 in which separate mechanisms are provided for revolving the cone and the rake arms independently of each other so as to regulate the movement of the material.

3. An apparatus for treating ore material comprising a casing having an ore inlet at its upper end, means for feeding a reagent gas into the casing, means for feeding ore to the casing without admitting a material amount of air, a vertical shaft mounted for rotation within the casing, a substantially cone shaped plate mounted on the rotatable shaft and spaced from the casing wall to form a discharge throat which serves both to support the ore within the reaction chamber and to feed it at a regulated rate therefrom, a substantially horizontal plate arranged therebelow for receiving the ore material discharged through the throat, and means including horizontally revolvable rake arms provided for moving the material across said plate and discharging it therefrom.

4. An ore treatment apparatus comprising a casing forming a deep reaction chamber which has an ore inlet at its upper end, means to introduce reagent gas to the chamber, a rotatable vertical shaft within the chamber, means comprising a cone mounted for rotation with said shaft about its vertical axis which supports a deep ore bed and forms a discharge throat therefor and which serves to remove material from the reaction chamber at a regulated rate, a plate arranged to receive the material discharged from said throat and which has an outlet opening therethrough, a set of rake arms for moving a thin bed of material over said plate and therethrough, and separate mechanisms for revolving the rake arms and the cone at controlled rates independently of each other.

5. An apparatus for treating an ore material comprising a casing having inlet and outlet openings at its upper and lower ends, a rotatable vertical shaft within the casing, a cone supported on the shaft for rotation therewith, and means within the casing associated with the cone to form a discharge throat, means for supplying reagent gas to the space beneath said throat, a bottom plate beneath the gas entrance and onto which ore material is discharged from the throat and which has an outlet opening therethrough, a set of rake arms adapted to move material over the bottom plate and through said opening, means for revolving the rake arms independently of the cone, means including a lower revolving cone beneath the horizontal plate and a flange on the casing which forms a further discharge device, and means for rotating the lower cone to discharge material through said throat.

6. An apparatus of the type covered by claim 5 in which a hopper is provided into which the lower cone discharges its material and means associated with said hopper serves to remove the material passing therethrough and without admitting any material amount of air into the casing.

7. An ore treatment apparatus comprising a casing forming a reaction chamber, means for introducing a reagent gas into a gas space beneath and thence into said chamber, two independently operated devices for feeding ore into the reaction chamber and downwardly therefrom into said space at separately controlled rates, and means for removing the ore from said gas space without admitting air thereto.

8. An ore treatment apparatus comprising a casing forming a reaction chamber, means for feeding ore material into the upper end thereof at a regulatable rate and without introducing a material amount of air, means for removing ore material from the chamber at a separately regulated rate and for maintaining within the chamber a controlled amount of material for reaction with a reagent gas, a gas space beneath but communicating with the reaction chamber and into which the ore material is fed, means for supplying gas thereto at a controlled rate, and means for removing the ore material continuously from the gas space at a separately regulated rate without admitting air to the chamber.

9. An ore treatment apparatus comprising a closed casing, means including a rotatable cone which cooperates with the casing to form a reaction chamber and support a deep bed of ore wherein the heat of reaction may accumulate, means forming a gas inlet chamber communicating with the reaction chamber which supports a shallow ore bed, controllable means for rotating the cone and thereby agitating the ore in the reaction chamber and feeding it therefrom to the gas inlet chamber while permitting the passage of gas therebetween, means for agitating the shallow bed in the gas inlet chamber, means for feeding ore to and from the apparatus without permitting the escape of gas, and means for introducing a reagent gas into the inlet chamber.

10. An apparatus of the type covered by claim 9 comprising means including revolvable rake arms to maintain the material as a shallow bed in the gas inlet chamber and to feed it therefrom.

11. An ore treatment apparatus comprising a casing having a closed top and an inlet and an outlet for the ore, a cone rotatable about a vertical axis which cooperates with the casing to form a support for a deep bed of ore in a reaction chamber and provides an ore discharge throat therefrom which permits the passage of gas upwardly, means cooperating with the casing which forms a lower gas inlet chamber and supports a shallow ore bed therein, means for introducing a reagent gas into said inlet chamber, where the gas reacts first with the partially treated ore and then passes to the reaction chamber, means for rotating the cone to agitate the ore thereon and to discharge it at a regulated rate into the gas inlet chamber, means for introducing ore into the reaction chamber and independently regulatable means for discharging it from the casing at separately regulated rates and which prevents the escape of the gas.

12. An ore treatment apparatus comprising a casing having a closed top and an inlet and an outlet for ore, means including a rotatable cone which cooperates with the casing to form an upper reaction chamber for a deep ore bed and a lower gas inlet chamber, means for introducing gas into the inlet chamber, means for feeding ore through said ore inlet into the reaction chamber without permitting the passage of gas, means for rotating the cone and agitating the ore within the reaction chamber and for feeding the ore to the gas inlet chamber which permits the passage of gas in the reverse direction, means including revolvable rake arms for agitating the ore within and removing it from the gas inlet chamber while causing it to be treated in a shallow ore bed, and which prevents the passage of gas through the casing outlet while permitting removal of the ore.

13. An apparatus of the type covered by claim 12 comprising separately operable mechanisms for revolving the cone and the rake arms at independently controllable rates.

14. An ore treatment apparatus comprising a closed casing, means cooperating therewith which forms a reaction chamber and supports a deep bed of ore wherein the heat of reaction may accumulate, means forming a gas inlet chamber communicating with the reaction chamber which supports a shallow ore bed, means forming an annular passage and a series of ports for introducing the gas into the inlet chamber, means for cleaning out the ports without interrupting the operation of the apparatus, controllable means for agitating the ore in the reaction chamber and feeding it therefrom to the gas inlet chamber while permitting the passage of gas therebetween, means for agitating the shallow bed in the gas inlet chamber, and means for feeding ore to and from the apparatus without permitting the escape of gas.

THOMAS A. MITCHELL.